US009993132B2

(12) United States Patent
Chen et al.

(10) Patent No.: US 9,993,132 B2
(45) Date of Patent: Jun. 12, 2018

(54) DISH TREATING APPLIANCE WITH LEAK DETECTION

(71) Applicant: WHIRLPOOL CORPORATION, Benton Harbor, MI (US)

(72) Inventors: David Chen, St. Joseph, MI (US); Mark S. Feddema, Kalamazoo, MI (US); Ryan K. Roth, Saint Joseph, MI (US); Demetrius J. Schaaf, Saint Joseph, MI (US); Mohan Takale, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 235 days.

(21) Appl. No.: 14/971,204

(22) Filed: Dec. 16, 2015

(65) Prior Publication Data

US 2017/0172372 A1 Jun. 22, 2017

(51) Int. Cl.
*A47L 15/00* (2006.01)
*A47L 15/42* (2006.01)
(Continued)

(52) U.S. Cl.
CPC ....... *A47L 15/4212* (2013.01); *A47L 15/0021* (2013.01); *A47L 15/4221* (2013.01);
(Continued)

(58) Field of Classification Search
CPC ............ A47L 15/0021; A47L 15/4212; A47L 15/4221; A47L 15/4293; A47L 15/502; A47L 15/507; A47L 2401/07; A47L 2401/34; A47L 2501/03; A47L 2501/07; A47L 2501/30; A47L 2501/32; F16K 31/041; F16K 31/043; G01M 3/16
(Continued)

(56) References Cited

U.S. PATENT DOCUMENTS 6,766,835 B1 7/2004 Fima
7,594,513 B2 9/2009 VanderRoest et al.
(Continued)

FOREIGN PATENT DOCUMENTS

DE 2350117 A1 4/1975
DE 2539279 A1 3/1977
WO 2004026708 A1 4/2004

OTHER PUBLICATIONS http://www.elecfreaks.com/estore/octopus-soil-moisture-sensor-brick.html, Item Specification for Octopus Soil Moisture Sensor Brick SUK: EF04027, accessed Dec. 16, 2015.
(Continued)

*Primary Examiner* — Levon J Shahinian

(74) *Attorney, Agent, or Firm* — McGarry Bair PC

(57) ABSTRACT

A dish treating appliance for treating dishes according to an automatic cycle of operation and including a tub at least partially defining a treating chamber, multiple sprayers emitting a liquid into the treating chamber, and a diverter valve having a rotatable valve body, which can be rotated to discrete rotational positions to selectively fluidly couple with the multiple sprayers. A rotary drive is located exteriorly of the tub and comprises a housing defining an interior with a liquid leak reservoir, a motor carried by the housing, an output shaft rotationally driven by the motor, extending through the housing and the tub, and operably coupled to the valve body, and a printed circuit board (PCB) located within the housing.

20 Claims, 6 Drawing Sheets

(51) Int. Cl.
*A47L 15/50* (2006.01)
*F16K 31/04* (2006.01)
*G01M 3/16* (2006.01)

(52) U.S. Cl.
CPC ......... *A47L 15/4293* (2013.01); *A47L 15/502* (2013.01); *A47L 15/507* (2013.01); *F16K 31/041* (2013.01); *G01M 3/16* (2013.01); A47L 2401/07 (2013.01); A47L 2401/34 (2013.01); A47L 2501/03 (2013.01); A47L 2501/07 (2013.01); A47L 2501/30 (2013.01); A47L 2501/32 (2013.01); F16K 31/043 (2013.01)

(58) Field of Classification Search
USPC ........ 134/56 D, 57 D, 58 D, 94.1, 98.1, 172, 134/184, 198
See application file for complete search history.

(56) References Cited

U.S. PATENT DOCUMENTS

| | | | |
|---|---|---|---|
| 7,966,099 B2 | 6/2011 | Fima | |
| 7,970,494 B2 | 6/2011 | Fima | |
| 2013/0000762 A1* | 1/2013 | Buddharaju | ........ A47L 15/4221 137/605 |
| 2014/0318585 A1* | 10/2014 | Kim | ................... A47L 15/4214 134/113 |

OTHER PUBLICATIONS http://www.rainbowkits.com/kits/wd-2p.html, Item Specification for Water Detector Sound Alarm Kit, Rainbowkits, 121 E. North St., New Ross, IN 47968, accessed Dec. 16, 2015.

* cited by examiner

DISH TREATING APPLIANCE WITH LEAK DETECTION

BACKGROUND

Contemporary automatic dish treating appliances for use in a typical household include a tub and at least one rack or basket for supporting soiled dishes within the tub. A spraying system with multiple sprayers can be provided for recirculating liquid throughout the tub to remove soils from the dishes. The spraying system can include various sprayers including a rotatable sprayer. A diverter valve having a rotatable valve body is used to selectively supply liquid from a recirculation pump to the various sprayers. The diverter can be located within the tub and a drive shaft extends through the tub to the rotatable valve body, with the rotation of the drive shaft effecting the rotation of the valve body. The interface between the drive shaft and the tub can provide a possible leak path from the tub.

BRIEF SUMMARY

In one aspect, an embodiment of the invention relates to a dish treating appliance for treating dishes according to an automatic cycle of operation, the dish treating appliance comprising a tub at least partially defining a treating chamber receiving dishes for treatment according to the automatic cycle of operation, multiple sprayers emitting a liquid into the treating chamber, and a diverter valve having a rotatable valve body, which can be rotated to discrete rotational positions to selectively fluidly couple with the multiple sprayers. A rotary drive is located exteriorly of the tub and comprises a housing defining an interior with a liquid leak reservoir, a motor carried by the housing, and an output shaft rotationally driven by the motor, extending through the housing and the tub, and operably coupled to the valve body. A printed circuit board (PCB) is located within the housing and has a liquid detection circuit comprising at least two traces extending into the liquid leak reservoir, wherein liquid leaking from the tub and running along the output shaft can enter the housing and flow along the liquid leak reservoir to short the two traces and provide an input to the liquid detection circuit.

In another aspect, an embodiment of the invention relates to a diverter valve assembly comprising a housing defining an interior with a liquid leak reservoir, a motor carried by the housing, an output shaft rotationally driven by the motor and extending through the housing, a printed circuit board (PCB) located within the housing and having a liquid detection circuit comprising at least two traces extending into the liquid leak reservoir, and a diverter valve having a rotatable valve body mounted to the output shaft, wherein liquid running along the output shaft can enter the housing and flow along the liquid leak reservoir to short the two traces and provide an input to the liquid detection circuit.

DETAILED DESCRIPTION

Figure 1:
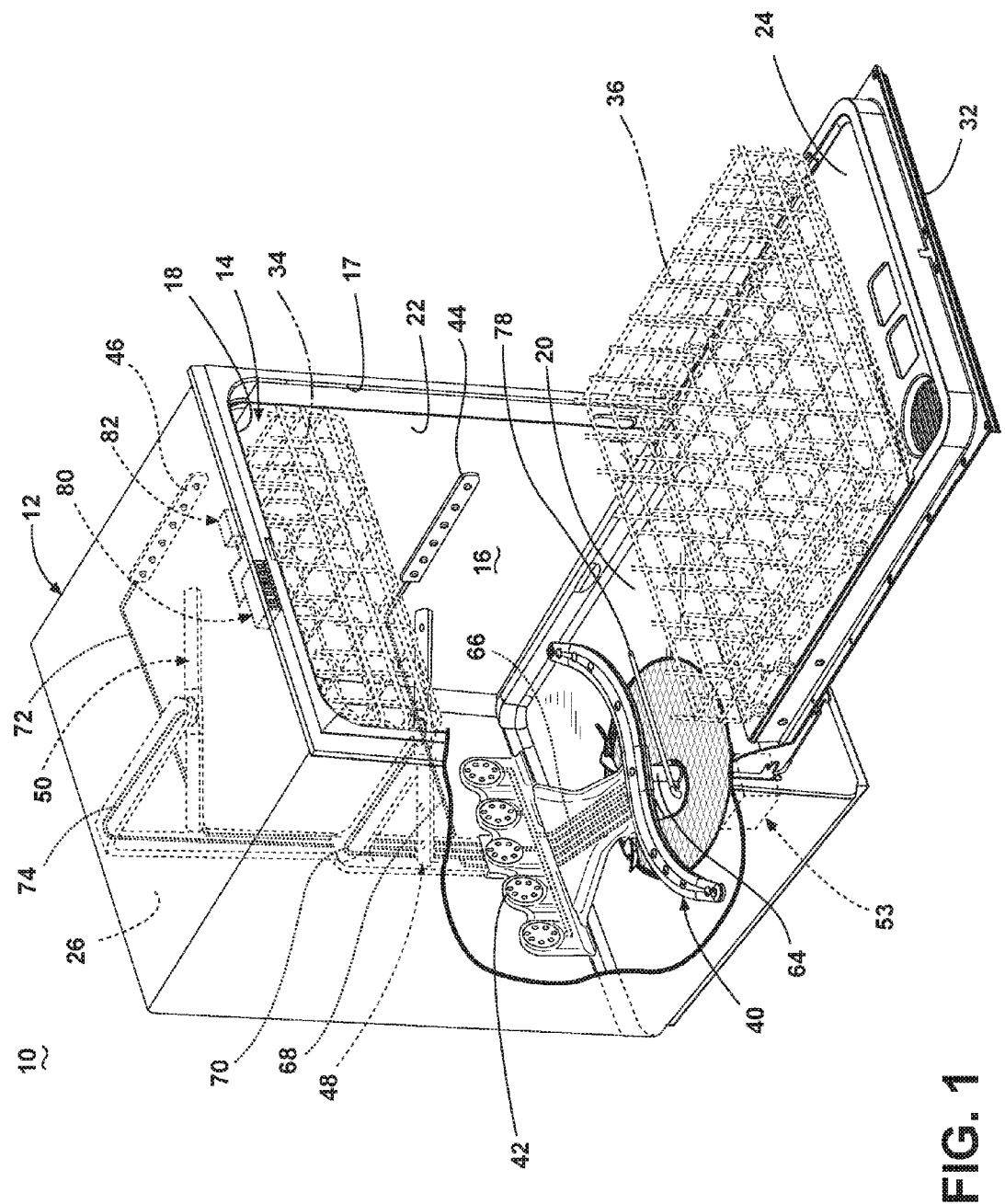
FIG. 1 is a perspective view of a dish treating appliance with a door opened and having a diverter valve according to an embodiment of the invention.

Referring to FIG. 1, an automatic dish treating appliance 10 having a cabinet 12 defining an interior is illustrated. Depending on whether the dish treating appliance 10 is a stand-alone or built-in, the cabinet 12 can be a chassis/frame with or without panels attached, respectively. The dish treating appliance 10 shares many features of a conventional automatic dish treating appliance, which will not be described in detail herein except as necessary for a complete understanding of the invention. While the present invention is described in terms of a conventional dishwashing unit, it could also be implemented in other types of dishwashing units, such as in-sink dish treating appliances, multi-tub dish treating appliances, or drawer-type dish treating appliances.

The cabinet 12 encloses a tub 14 at least partially defining a treating chamber 16 for receiving dishes for treatment according to an automatic cycle of operation and defining an access opening 17. The tub 14 has spaced top and bottom walls 18 and 20, spaced sidewalls 22, a front wall 24, and a rear wall 26. In this configuration, the walls 18, 20, 22, 24, and 26 collectively define the treating chamber 16 for treating or washing dishes. The bottom wall 20 may have a front lip 28 (FIG. 2) with an upper portion 30 that may define a portion of the access opening 17. The front wall 24 may be at least partially defined by a door 32 of the dish treating appliance 10, which may be pivotally attached to the dish treating appliance 10 for providing accessibility to the treating chamber 16 through the access opening 17 for loading and unloading dishes or other washable items. More specifically, the door 32 may be configured to selectively open and close the access opening 17.

Dish holders in the form of upper and lower dish racks 34, 36 are located within the treating chamber 16 and receive dishes for washing. The upper and lower racks 34, 36 may be mounted for slidable movement in and out of the treating chamber 16 for ease of loading and unloading. As used in this description, the term "dish(es)" is intended to be generic to any item, single or plural, that may be treated in the dish treating appliance 10, including, without limitation; utensils, plates, pots, bowls, pans, glassware, and silverware. While not shown, additional utensil holders, such as a silverware basket on the interior of the door 32 or on a sidewall 22, can also be provided.

Figure 2:
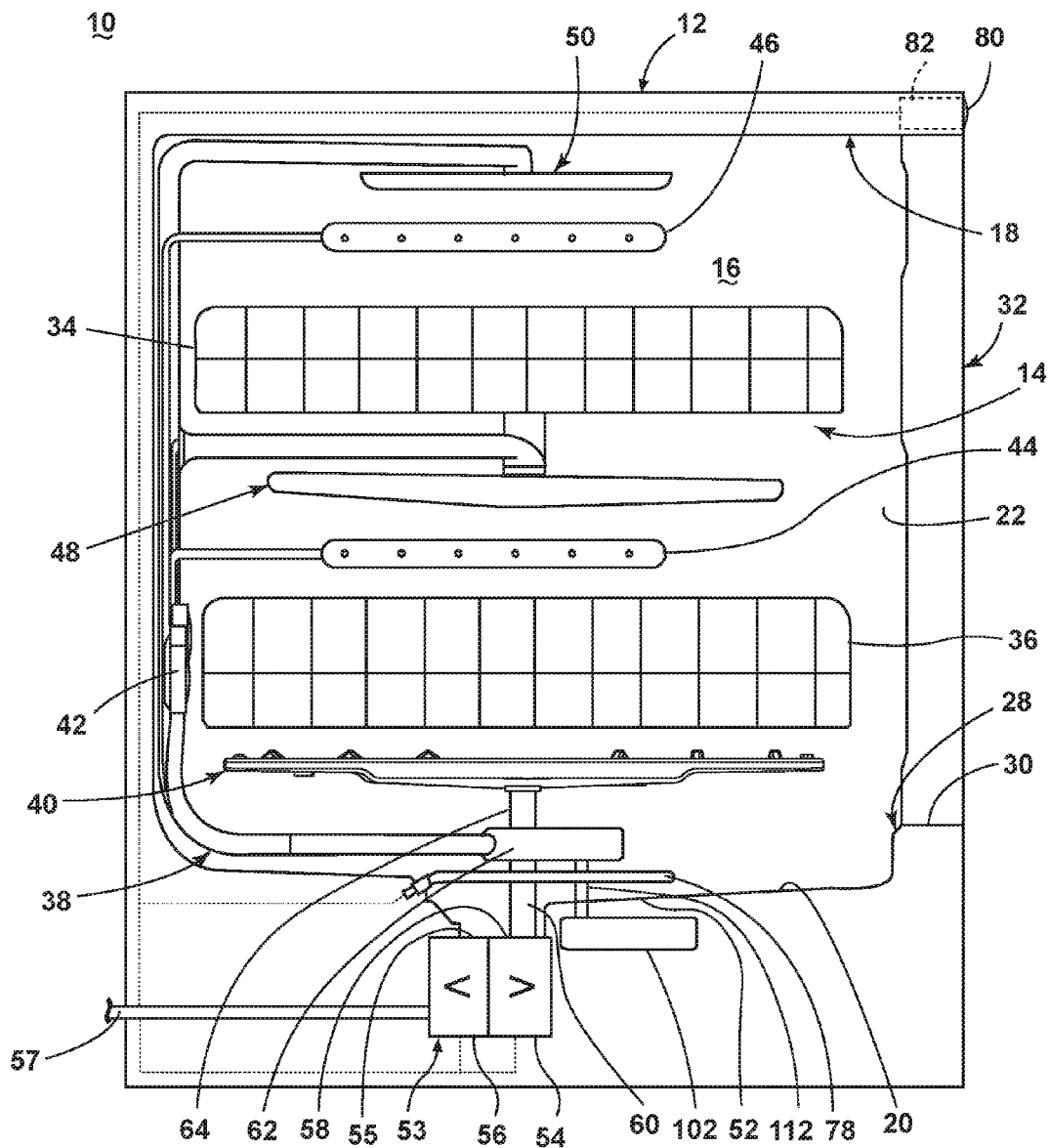
FIG. 2 is a partial schematic cross-sectional view of the dish treating appliance shown in FIG. 1, with the door closed.

Referring to FIG. 2, the major systems of the dish treating appliance 10 and their interrelationship may be seen. For example, a liquid recirculation system 38 is provided for spraying liquid within the treating chamber 16 to treat any dishes located therein. The liquid recirculation system 38 may include one or more sprayers configured to emit a corresponding spray of liquid into the treating chamber 16. In the exemplary illustration, there are six sprayers: a first lower spray assembly 40, a second lower spray assembly 42, a third lower spray assembly 44, a first mid-level spray assembly 46, a second mid-level spray assembly 48, and an upper spray assembly 50. While six sprayers have been illustrated it will be understood that any number of sprayers can be included in the dish treating appliance, located in virtually any part of the treating chamber, and that at least one of the multiple sprayers can be included as a spray manifold having a plurality of nozzles. Such a spray manifold is set forth in detail in U.S. Pat. No. 7,594,513, issued Sep. 29, 2009, and titled "Multiple Wash Zone Dishwasher," which is incorporated herein by reference in its entirety.

A sump 52 and pump assembly 53 can be included in the liquid recirculation system 38. The sump 52 collects the liquid sprayed in the treating chamber 16 and can be formed by a sloped or recessed portion of a bottom wall 20 of the tub 14. The pump assembly 53 can include both a wash or recirculation pump 54 and a drain pump 56. The drain pump 56 can draw liquid from the sump 52 through a drain inlet 55 and pump the liquid out of the dish treating appliance 10 to a household drain line 57. The recirculation pump 54 can draw liquid from the sump 52 and pump the liquid to the one or more of the spray assemblies 40-50 to supply liquid into the treating chamber 16. While the pump assembly 53 is illustrated as having separate drain and recirculation pumps 54 and 56 in an alternative embodiment, the pump assembly 53 can include a single pump configured to selectively supply wash liquid to either the spray assemblies 40-50 or the drain line 57, such as by configuring the pump to rotate in opposite directions, or by providing a suitable valve system. While not shown, a liquid supply system can include a water supply conduit coupled with a household water supply for supplying water to the sump 52.

As shown herein, the recirculation pump 54 has a pump inlet 58 fluidly coupled to the treating chamber 16 via the sump 52 and a pump outlet 60 in fluid communication with a diverter valve 62. The diverter valve 62 is coupled to a rotary drive 102 by an output shaft 112. A number of liquid conduits 64, 66, 68, 70, 72, and 74 in turn fluidly couple the diverter valve 62 to the spray assemblies 40-50, respectively. In this manner, the pump outlet 60 is fluidly coupled to the spray assemblies 40-50 for discharging wash liquid from the recirculation pump 54 to the spray assemblies 40-50. As illustrated, liquid can be supplied to the spray assemblies 42-50 through liquid conduits 66, 68, 70, 72, and 74 that extend generally rearward from the recirculation pump 54 and upwardly along a rear wall of the tub 14. Liquid can be supplied to the spray assembly 40 through the liquid conduit 64.

The diverter valve 62 can control the flow of liquid within the dish treating appliance 10. While the diverter valve 62 has been illustrated as being located in the middle of the tub 14 it will be understood that the diverter valve 62 can be located in any suitable location. The diverter valve 62 allows liquid to be selectively supplied to a subset of all of the sprayers, including to only a single sprayer, and/or simultaneously to all of the sprayers. The sump 52, recirculation pump 54, spray assemblies 40-50, and liquid conduits 64-74 collectively form a recirculation flow path in the liquid recirculation system 38. It will be understood that the recirculation flow path includes multiple recirculation circuits, with each circuit coupled to at least one of the sprayers forming the spray assemblies 40-50. The recirculation pump 54 may be fluidly coupled to one or more of the circuits such that it draws liquid in through the pump inlet 58 and sump 52 and delivers it to one or more of the spray assemblies 40-50 through the liquid conduits 64-74 depending on the operation of the diverter valve 62. The liquid is sprayed back into the treating chamber 16 through the spray assemblies 40-50 and drains back to the sump 52 where the process may be repeated.

A heating system having a heater 78 can be located within or near the sump 52 for heating liquid contained in the sump 52. A filtering system (not shown) can be fluidly coupled with the recirculation flow path for filtering the recirculated liquid.

A control panel or user interface 80 provided on the dish treating appliance 10 and coupled to a controller 82 may be used to select a cycle of operation. The user interface 80 may be provided on the cabinet 12 or on the outer panel of the door 32 and can include operational controls such as dials, lights, switches, and displays enabling a user to input commands to the controller 82 and receive information about the selected cycle of operation. The dish treating appliance 10 may further include other conventional components such as additional valves, a dispensing system for dispensing treating chemistries or rinse aids, spray arms or nozzles, etc.; however, these components are not germane to the present invention and will not be described further herein.

Figure 3:
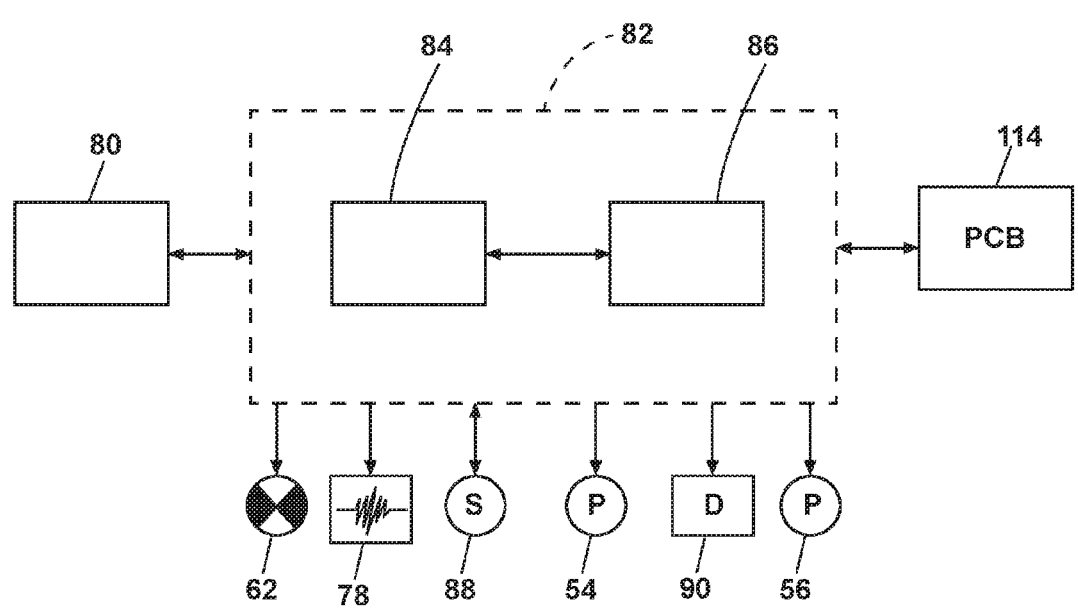
FIG. 3 is a schematic view of a control system of the dish treating appliance of FIG. 1.

As illustrated in FIG. 3, the controller 82 may be provided with a memory 84 and a central processing unit (CPU) 86. The memory 84 may be used for storing control software that may be executed by the CPU 86 in completing a cycle of operation using the dish treating appliance 10 and any additional software. For example, the memory 84 may store one or more pre-programmed cycles of operation that may be selected by a user and completed by the dish treating appliance 10. The controller 82 may be operably coupled with one or more components of the dish treating appliance 10 for communicating with and controlling the operation of the components to complete a cycle of operation. For example, the controller 82 may be coupled with the recirculation pump 54, the diverter valve 62, and a printed circuit board (PCB) for circulation of liquid in the wash tub 14 and the drain pump 56 for drainage of liquid in the wash tub 14. Further, the controller 82 may also be coupled with one or more temperature sensors 88, which are known in the art and not shown for simplicity, such that the controller 82 may control the duration of the steps of the cycle of operation based upon the temperature detected. The controller 82 may also receive inputs from one or more other optional sensor, which are known in the art and not shown for simplicity. The controller 82 may also be coupled to a dispenser 90, which may dispense a detergent during the wash step of the cycle of operation or a rinse aid during the rinse step of the cycle of operation.

Figure 4:
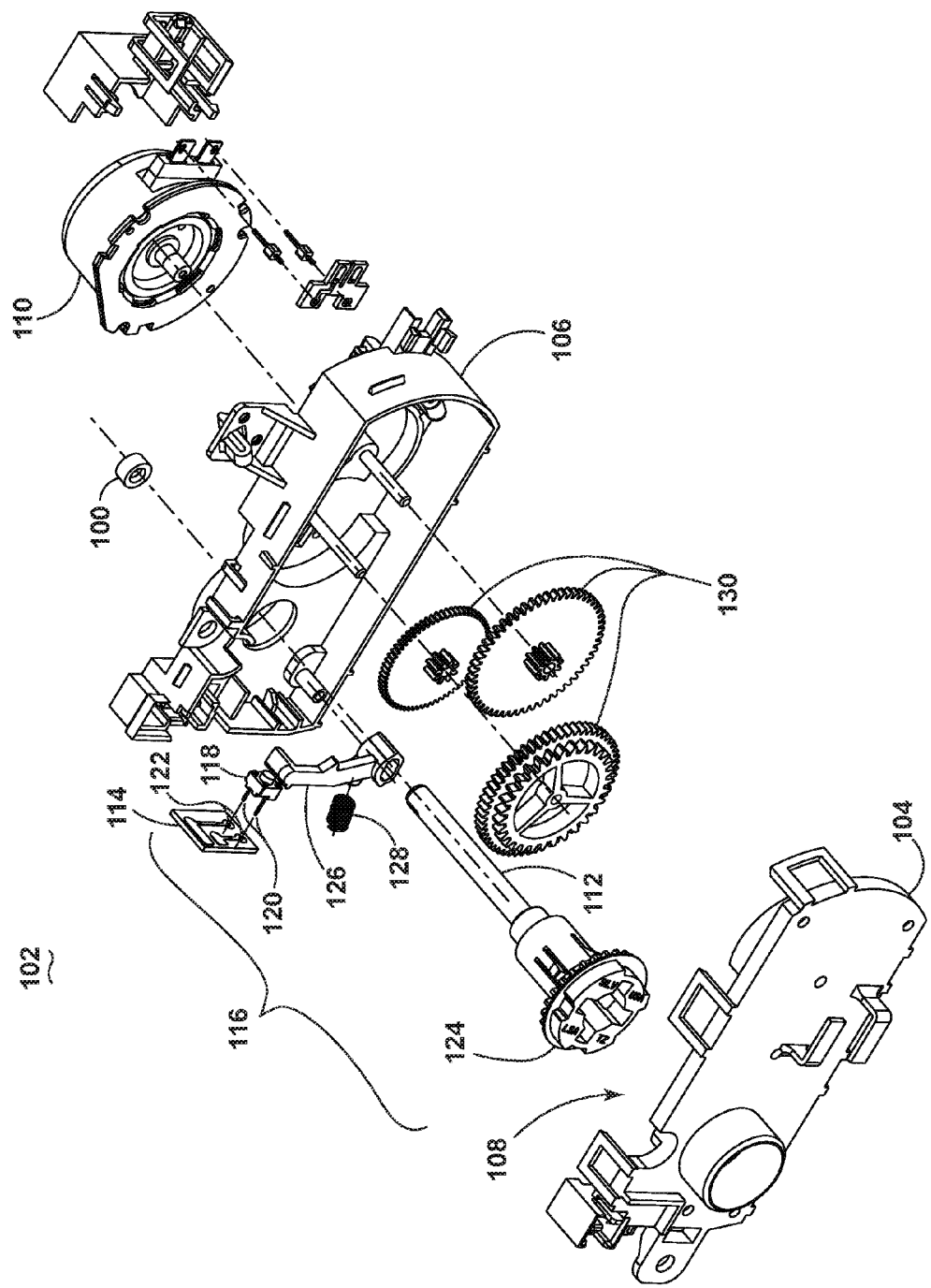
FIG. 4 is an exploded view of an exemplary diverter valve rotary drive that can be utilized in the dish treating appliance of FIG. 2.

FIG. 4 illustrates an exploded view of an example of a rotary drive 102 for a diverter valve 62 having a rotatable valve body. The rotary drive 102 comprises a housing having a lower housing 104 and an upper housing 106, a motor 110 carried by the upper housing 106, and a printed circuit board (PCB) 114, which are located external to the tub 14. An output shaft 112 protrudes through the top of the upper housing 106 and extends up to the diverter valve 62, passing through the bottom wall 20 of the tub 14. A lip seal 100 is provided around the output shaft 112 at the point at which it passes through the bottom wall 20 of the tub 14. The lower housing 104 defines an interior with a liquid leak reservoir 108. The motor 110 is mounted to or adjacent the exterior of the upper housing 106. The valve body of the diverter valve 62 is mounted to the output shaft 112 such that the output shaft 112 is operably coupled to the rotatable valve body. The PCB 114 is located within the lower housing 104 and has two traces 122. A gear train 130 operably couples the electric motor 110 to the output shaft 112. In a contemplated embodiment, the gear train 130 is provided as a reduction gear train.

The rotary drive 102 further comprises a rotary position sensor 116 for the output shaft 112 wherein the PCB 114 forms a part of the rotary position sensor 116. The rotary position sensor 116 also comprises a microswitch 118 that is mounted on the PCB 114 with pins 120 that connect to the two traces 122. The rotary position sensor 116 also comprises a detented cam 124 and a cam follower 126. The detented cam 124 is coupled to the output shaft 112. The angular spacing and shape of the detents on the face of the detented cam 124 are unique to the different positions corresponding to the different outlets that can be defined by the diverter valve 62. The cam follower 126 is coupled to the output shaft 112 and is located between the microswitch 118 and the detented cam 124 of the rotary position sensor 116. There is further provided a biasing element 128 to urge the cam follower 126 against the cam 124.

The operation of the dish treating appliance 10 with the rotary drive 102 for the diverter valve 62 as illustrated will now be described. The user will initially select a cycle of operation via the user interface 80, with the cycle of operation being implemented by the controller 82 controlling various components of the dish treating appliance 10 to implement the selected cycle of operation in the treating chamber 16. Examples of cycles of operation include normal, light/china, heavy/pots and pans, and rinse only. The cycles of operation can include one or more of the following phases: a wash phase, a rinse phase, and a drying phase. The wash phase can further include a pre-wash phase and a main wash phase. The rinse phase can also include multiple phases such as one or more additional rinsing phases performed in addition to a first rinsing. During such cycles, wash fluid, such as water and/or treating chemistry (i.e., water and/or detergents, enzymes, surfactants, and other cleaning or conditioning chemistry) passes from the recirculation pump 54 into the liquid recirculation system 38 and then exits through the spray assemblies 40-50.

Turning now to the operation of the rotary drive 102 for the diverter valve 62, the motor 110 can then be operated, including via the controller 82, to rotationally drive the output shaft 112 by way of the gear train 130. The output shaft 112 is driven to rotate such that the cam 124 pushes upon the microswitch 118 as the output shaft 112 rotates. The rotatable valve body and coupled detented cam 124 can be rotated to discrete rotational positions in order to selectively fluidly couple with at least one of the multiple spray assemblies 40-50. The detented cam 124 indicates the intended position of the diverter valve 62 by the identifiable and distinguishable detent patterns on the cam 124 that determine which path the flow of liquid through the diverter valve 62 will take so that a different spray assembly can be fluidly coupled with the recirculation pump 54. The lip seal 100 is provided around the output shaft 112 to prevent the leakage of liquid from around the output shaft 112 where it passes through the tub 14. If the lip seal 100 experiences wear with repeated use and rotation, liquid can leak from around the output shaft 112 and collect in the liquid leak reservoir 108 of the lower housing 104.

Figure 5:
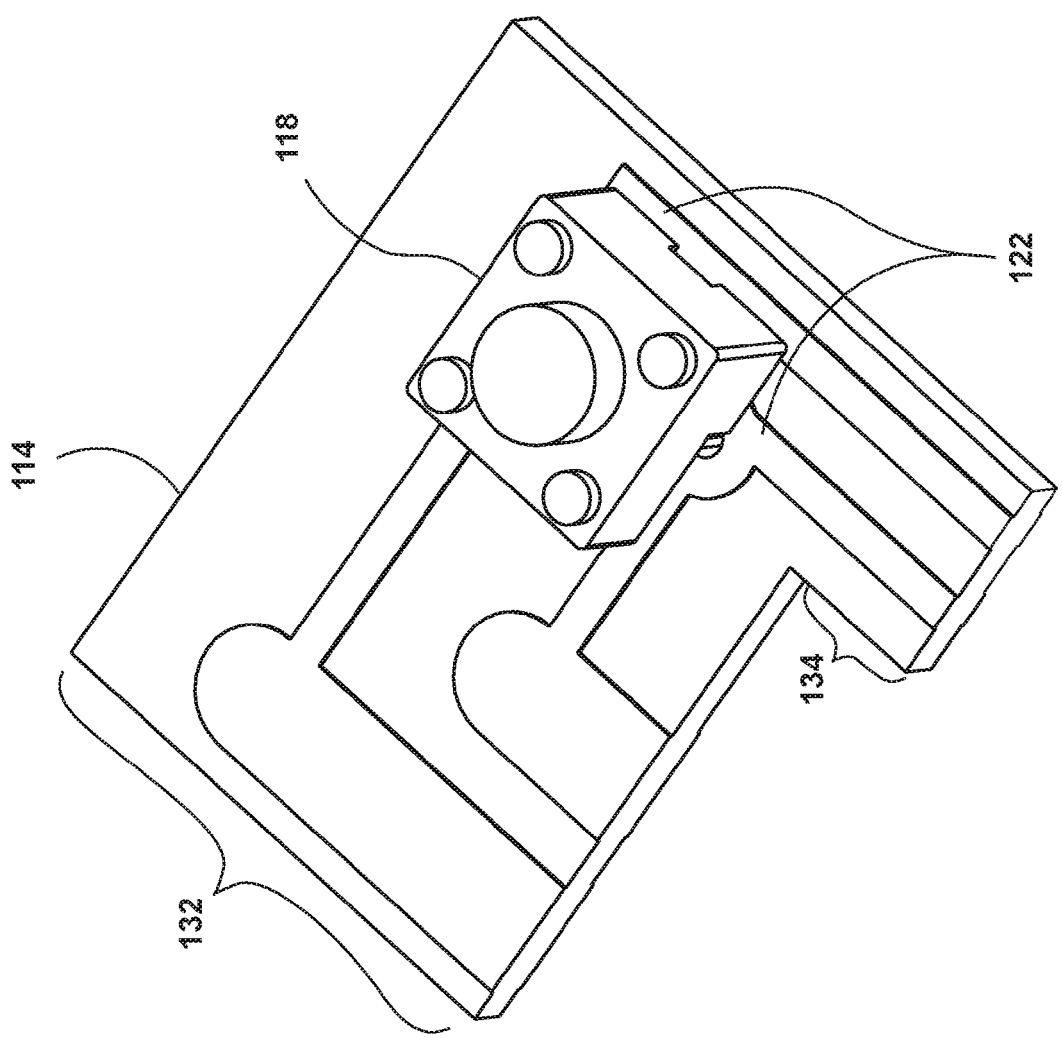
FIG. 5 is an enlarged view of a printed circuit board that can be utilized in conjunction with the exemplary diverter valve rotary drive of FIG. 4.

FIG. 5 illustrates an enlarged view of the PCB 114 with the attached microswitch 118. The PCB comprises a main body 132 portion and an extension 134 that is a projection from the main body 132. The two traces 122 extend along and are located on the extension 134. These two traces 122 make up a liquid detection circuit. While the embodiment exemplified herein illustrates the liquid detection circuit being made up of two traces 122, it is also contemplated more than two traces 122 could make up the liquid detection circuit.

Figure 6:
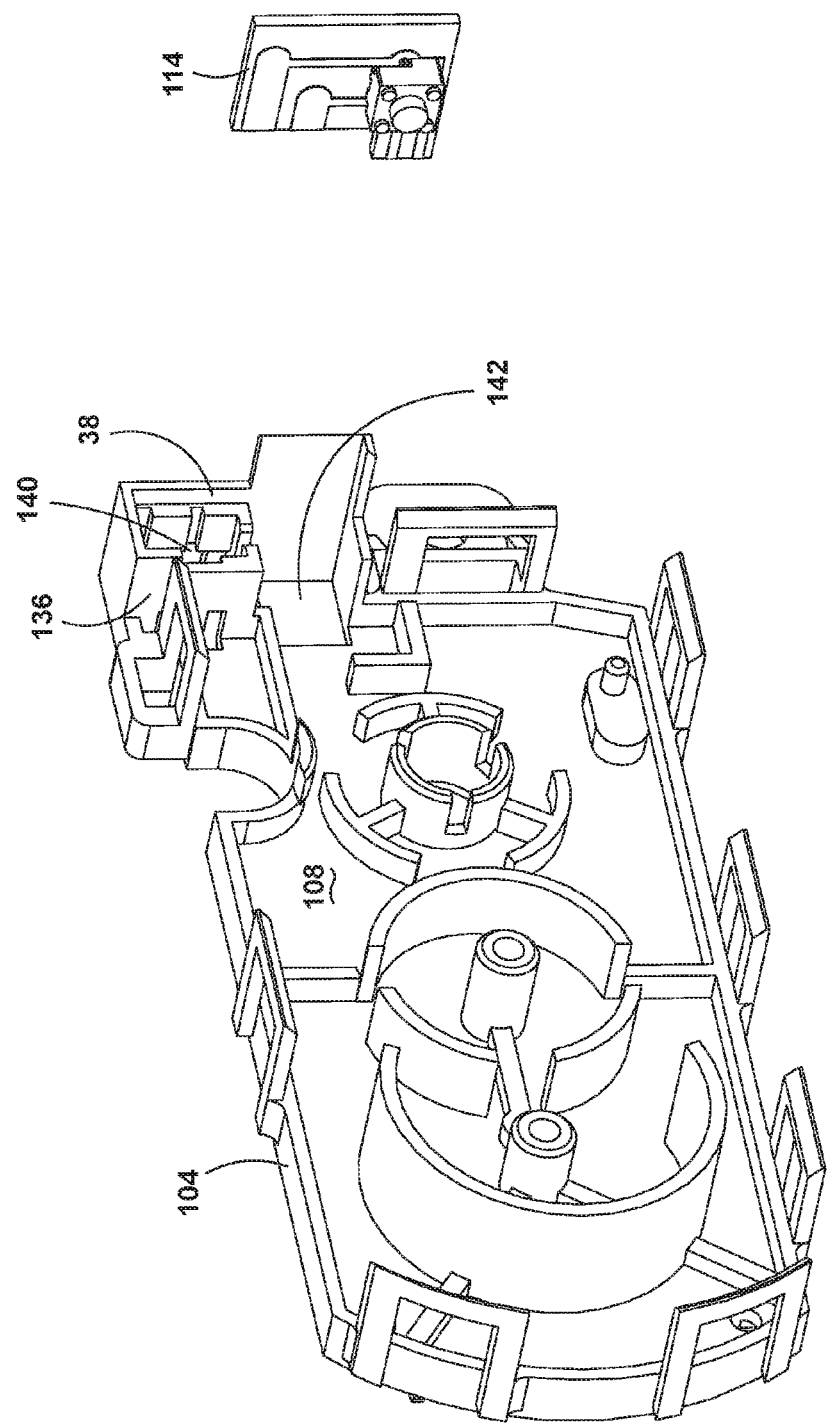
FIG. 6 is a perspective view of a housing and a printed circuit board that can be utilized in the exemplary diverter valve rotary drive of FIG. 4.

FIG. 6 illustrates a perspective view of the lower housing 104 and the PCB 114 in the orientation in which it is positioned within the lower housing 104. The interior of the lower housing 104 defines the liquid leak reservoir 108. In a corner portion of the lower housing 104, there is provided a pair of spaced walls 136, 138 that define a channel 140. The PCB 114 resides within the channel 140 in such a way that the PCB 114 is mounted generally orthogonal to the channel 140. The extension 134 of the PCB 114 extends into the channel 140 of the liquid leak reservoir 108 and towards a bottom surface 142 of the lower housing 104.

Referring now to the operation of the liquid detection circuit of the PCB 114, when liquid leaks from the tub 14 and runs along the output shaft 112, the liquid can enter the area of the lower housing 104 and flow along within the liquid leak reservoir 108. As the leaked liquid flows within the liquid leak reservoir 108 and towards the channel 140, the liquid will come into contact with the at least two traces 122 provided on the extension 134 of the PCB 114 that extends into the channel 140 of the liquid leak reservoir 108. When liquid contacts the two traces 122, a short will occur in the PCB 114, which is provided as an input to the liquid detection circuit. Under normal circumstances with no leaking of liquid occurring, there is no liquid present in the liquid leak reservoir 108 and the PCB 114 will operate as designed. Once a short has occurred, the controller 82 is no longer able to sense the position of the diverter valve 62. When the controller 82 registers that it cannot sense the diverter valve 62 position for more than a predetermined number of consecutive cycles, the controller 82 can send a signal to disable the diverter valve 62 to wait for service and repair. Alternatively, the short will close the circuit sending a constant signal, which also can be used to indicate the leak.

In an alternate embodiment, it is also considered that the PCB 114 could be provided without the extension 134, such that the PCB 114 does not extend into the channel 140 of the liquid leak reservoir 108. In this embodiment, the liquid leak reservoir 108 would function as a basin. If liquid were to leak from the tub 14, run along the output shaft 112, and enter the area of the lower housing 104, the liquid would accumulate and fill the liquid leak reservoir 108. When the liquid reaches a high enough level within the liquid leak reservoir 108, the liquid would contact the body 132 of the PCB 114, resulting in a short occurring in the PCB 114, which provides an input to the liquid detection circuit. Once this short has occurred, the controller 82 is no longer able to sense the position of the diverter valve 62. When the controller 82 registers that it cannot sense the position of the diverter valve 62, the controller 82 can send a signal to disable the diverter valve 62 to wait for service and repair. Furthermore, the controller 82 can be configured to disable the dish treating appliance 10 entirely, such that a service call is required before the dish treating appliance 10 can execute a next cycle of operation.

The above-described embodiments provide a variety of benefits including that a diverter valve can be provided with a simple method for early detection of leaking along the seal of the diverter valve. The providing leak sensing concept is relatively low cost and upgrades the functionality of the microswitch and the PCB in order to improve moisture resistance capability and maintain the long lasting durability of the dish treating appliance. Being able to quickly detect any leaks present allows for prompt service and eliminates the risk of further wear or damage to the machine as a result of ongoing leaking.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure. Further, while the invention has been specifically described in connection with certain specific embodiments thereof, it is to be understood that this is by way of illustration and not of limitation.

The patentable scope of the invention is defined by the claims, and can include other examples that occur to those skilled in the art. It will be understood that any features of the above-described embodiments can be combined in any manner. Reasonable variation and modification are possible within the scope of the forgoing disclosure and drawings without departing from the spirit of the invention, which is defined in the appended claims.

What is claimed is:

1. A dish treating appliance for treating dishes according to an automatic cycle of operation, the dish treating appliance comprising:
a tub at least partially defining a treating chamber receiving dishes for treatment according to the automatic cycle of operation;
multiple sprayers emitting a liquid into the treating chamber;
a diverter valve having a rotatable valve body, which can be rotated to discrete rotational positions to selectively fluidly couple with the multiple sprayers; and
a rotary drive located exteriorly of the tub and comprising:
a housing defining an interior with a liquid leak reservoir;
a motor carried by the housing;
an output shaft rotationally driven by the motor, extending through the housing and the tub, and operably coupled to the valve body;
a printed circuit board (PCB) located within the housing and having a liquid detection circuit comprising at least two traces extending into the liquid leak reservoir; and
a rotary position sensor for the output shaft, wherein the PCB forms part of the rotary position sensor;
wherein liquid leaking from the tub and running along the output shaft can enter the housing and flow along the liquid leak reservoir to short the two traces and provide an input to the liquid detection circuit.

2. The dish treating appliance of claim 1 wherein the rotary position sensor comprises a microswitch on the PCB.

3. The dish treating appliance of claim 2 wherein the microswitch has pins connected to the two traces.

4. The dish treating appliance of claim 2 wherein the rotary position sensor comprises a detented cam coupled to the output shaft and a cam follower located between the microswitch and the detented cam.

5. The dish treating appliance of claim 4 further comprising a biasing element urging the cam follower against the detented cam.

6. The dish treating appliance of claim 1 further comprising a gear train operably coupling the motor to the output shaft.

7. The dish treating appliance of claim 6 wherein the gear train is a reduction gear train.

8. The dish treating appliance of claim 1 wherein the motor is mounted to the exterior of the housing.

9. The dish treating appliance of claim 1 wherein the housing comprises spaced walls defining a channel and the PCB resides within the channel.

10. The dish treating appliance of claim 9 wherein the PCB is mounted generally orthogonal to the channel.

11. The dish treating appliance of claim 9 wherein the PCB comprises a main body and an extension projection from the main body, with the two traces located on the extension, and the extension extends into the channel.

12. The dish treating appliance of claim 1 wherein the PCB comprises a main body and an extension projection from the main body, with the two traces located on the extension.

13. A diverter valve assembly comprising:
a housing defining an interior with a liquid leak reservoir;
a motor carried by the housing;
an output shaft rotationally driven by the motor and extending through the housing;
a printed circuit board (PCB) located within the housing and having a liquid detection circuit comprising at least two traces extending into the liquid leak reservoir;
a diverter valve having a rotatable valve body mounted to the output shaft; and
a rotary drive further comprising a rotary position sensor for the output shaft, wherein the PCB forms part of the rotary position sensor;
wherein liquid running along the output shaft can enter the housing and flow along the liquid leak reservoir to short the two traces and provide an input to the liquid detection circuit.

14. The diverter valve assembly of claim 13 wherein the rotary position sensor comprises a microswitch on the PCB.

15. The diverter valve assembly of claim 14 wherein the microswitch has pins connected to the two traces.

16. The diverter valve assembly of claim 14 wherein the rotary position sensor comprises a detented cam coupled to the output shaft and a cam follower located between the microswitch and the detented cam.

17. The diverter valve assembly of claim 16 further comprising a biasing element urging the cam follower against the detented cam.

18. The diverter valve assembly of claim 13 further comprising a reduction gear train operably coupling the motor to the output shaft.

19. The diverter valve assembly of claim 13 wherein the PCB comprises a main body and an extension projection from the main body, with the two traces located on the extension.

20. The diverter valve assembly of claim 19 wherein the extension extends into a channel.

* * * * *